(12) United States Patent
Mueller et al.

(10) Patent No.: US 9,321,422 B2
(45) Date of Patent: Apr. 26, 2016

(54) VEHICLE BODY STRUCTURE

(71) Applicant: Nissan North America, Inc., Franklin, TN (US)

(72) Inventors: Joseph Mueller, Madison Heights, MI (US); Neal Osterhout, Macomb, MI (US); Jeffery Dix, Commerce Twp., MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/597,358

(22) Filed: Jan. 15, 2015

(65) Prior Publication Data

US 2015/0130172 A1 May 14, 2015

Related U.S. Application Data

(63) Continuation of application No. 13/900,883, filed on May 23, 2013, now Pat. No. 8,967,661.

(51) Int. Cl.
*B60R 21/213* (2011.01)
*B60R 21/231* (2011.01)
*B60R 21/214* (2011.01)
*B60R 21/232* (2011.01)

(52) U.S. Cl.
CPC ......... *B60R 21/23138* (2013.01); *B60R 21/213* (2013.01); *B60R 21/214* (2013.01); *B60R 21/231* (2013.01); *B60R 21/232* (2013.01); *B60R 2021/23107* (2013.01)

(58) Field of Classification Search
CPC .... B60R 21/21; B60R 21/213; B60R 21/214; B60R 21/232; B60R 21/23107; B60R 21/23138

USPC ....................................................... 280/730.2
See application file for complete search history.

(56) References Cited

U.S. PATENT DOCUMENTS

| 5,333,899 | A | * | 8/1994 | Witte ................ B60R 21/23138 280/728.1 |
| 5,588,672 | A | | 12/1996 | Karlow et al. |
| 5,605,346 | A | | 2/1997 | Cheung et al. |
| 5,660,414 | A | | 8/1997 | Karlow et al. |
| 5,865,462 | A | * | 2/1999 | Robins ................ B60R 21/232 280/730.2 |
| 6,059,311 | A | | 5/2000 | Wipasuramonton et al. |
| 6,073,960 | A | | 6/2000 | Viano et al. |
| 6,079,732 | A | | 6/2000 | Nakajima et al. |

(Continued)

FOREIGN PATENT DOCUMENTS

EP 1227014 B1 7/2002

*Primary Examiner* — James English
(74) *Attorney, Agent, or Firm* — Global IP Counselors, LLP

(57) ABSTRACT

A vehicle body structure includes a pillar, a roof rail, a pillar trim panel mounted to the pillar, a pillar airbag and a curtain airbag. The pillar airbag is mounted to the pillar in a stowed orientation between the pillar trim panel and the pillar. The pillar airbag is arranged to be deployed in a first direction extending away from the pillar in a deployed orientation. The curtain airbag is mounted to the roof rail in a stowed orientation along the roof rail, and is arranged to be deployed in a downward direction extending away from the roof rail to a deployed orientation. The pillar airbag is positioned outboard of the curtain airbag with the curtain airbag overlaying a portion of the pillar airbag with respect to a second direction transverse to the first direction while the pillar airbag and the curtain airbag are in their deployed orientations, respectively.

21 Claims, 8 Drawing Sheets

(56) References Cited

U.S. PATENT DOCUMENTS

| | | |
|---|---|---|
| 6,237,943 B1 | 5/2001 | Brown et al. |
| 6,402,191 B1 | 6/2002 | Sinnhuber |
| 6,412,810 B1 | 7/2002 | Wipasuramonton et al. |
| 6,517,104 B1 | 2/2003 | Patel |
| 6,893,045 B2 | 5/2005 | Inoue et al. |
| 6,896,288 B2 | 5/2005 | Tanaka et al. |
| 6,902,188 B2 | 6/2005 | Nakamura et al. |
| 6,938,920 B2 | 9/2005 | Inoue et al. |
| 7,219,921 B2 | 5/2007 | Noguchi |
| 7,267,364 B2 | 9/2007 | Noguchi et al. |
| 7,273,228 B2 | 9/2007 | Noguchi et al. |
| 7,306,258 B2 | 12/2007 | Noguchi et al. |
| 7,325,826 B2 | 2/2008 | Noguchi et al. |
| 7,338,071 B2 | 3/2008 | Noguchi et al. |
| 7,347,447 B2 | 3/2008 | Nakanishi |
| 7,357,413 B2 | 4/2008 | Noguchi et al. |
| 7,896,387 B2 | 3/2011 | Ideue |
| 2002/0171233 A1 | 11/2002 | Grace |
| 2003/0075906 A1* | 4/2003 | Inoue .................. B60R 13/02 280/730.2 |
| 2003/0080541 A1 | 5/2003 | Kalandek et al. |
| 2003/0141711 A1* | 7/2003 | Inoue .................. B60R 13/02 280/749 |
| 2008/0296876 A1 | 12/2008 | Ideue |
| 2009/0058054 A1 | 3/2009 | Nelson et al. |
| 2010/0032928 A1* | 2/2010 | Yamanishi ............ B60R 21/232 280/728.3 |
| 2012/0235391 A1 | 9/2012 | Obara et al. |
| 2013/0001933 A1* | 1/2013 | Umehara ............ B60R 21/213 280/730.2 |
| 2014/0265271 A1* | 9/2014 | Dinsdale .......... B60R 21/23138 280/730.2 |
| 2014/0346758 A1* | 11/2014 | Mueller ............. B60R 21/213 280/730.2 |

* cited by examiner

VEHICLE BODY STRUCTURE

CROSS-REFERENCE TO RELATED APPLICATIONS

This U.S. application is a continuation of U.S. application Ser. No. 13/900,883, filed May 23, 2013, and claims priority thereto. The entire contents of U.S. application Ser. No. 13/900,883 are hereby incorporated herein by reference in their entirety.

BACKGROUND

1. Field of the Invention

The present invention generally relates to vehicle body structure. More specifically, the present invention relates to a vehicle body structure that includes a pillar airbag and a curtain airbag arranged such that in deployed orientations, the pillar airbag is positioned outboard of the curtain airbag and the curtain airbag overlays a portion of the pillar airbag.

2. Background Information

In recent years vehicles have been equipped with airbags. Originally, airbags were installed at the front of the passenger compartment, for example, within a portion of the steering wheel assembly and/or compartments concealed within the instrument panel. Many vehicles are now also equipped with airbag curtains that each cover at least a portion of an interior surface of a corresponding vehicle window when deployed.

SUMMARY

In accordance with one aspect of the disclosure, a vehicle body structure is provided with a curtain airbag and a pillar airbag where one of the curtain airbag and the pillar airbag at least partially overlaps or overlays the other such that a corresponding vehicle window is completely covered when the curtain airbag and the pillar airbag are in their respective deployed orientations.

In view of the state of the known technology, one aspect of the disclosure is to provide a vehicle body structure that includes a pillar, a roof rail located above the pillar, a pillar trim panel mounted to the pillar, a pillar airbag and a curtain airbag. The pillar airbag is mounted to the pillar in a stowed orientation between the pillar trim panel and the pillar. The pillar airbag is arranged to be deployed in a first direction extending away from the pillar in a deployed orientation. The curtain airbag is mounted to the roof rail in a stowed orientation along the roof rail, and is arranged to be deployed in a downward direction extending away from the roof rail to a deployed orientation. The pillar airbag is also arranged to be positioned outboard of the curtain airbag with the curtain airbag overlaying a portion of the pillar airbag with respect to a second direction transverse to the first direction while the pillar airbag and the curtain airbag are in their deployed orientations, respectively.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
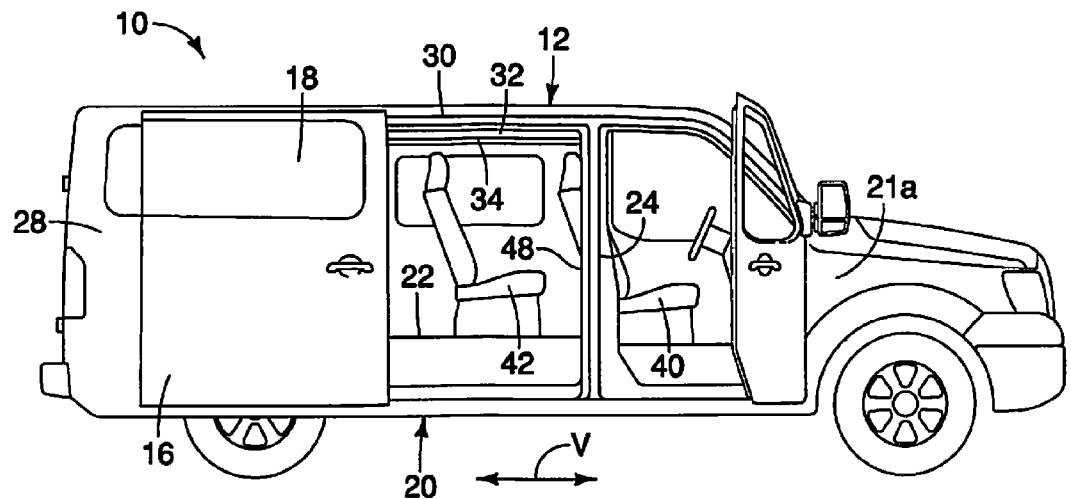
FIG. 1 is a side elevation of a vehicle that includes a sliding door with a door window in accordance with one embodiment.
Figure 2:
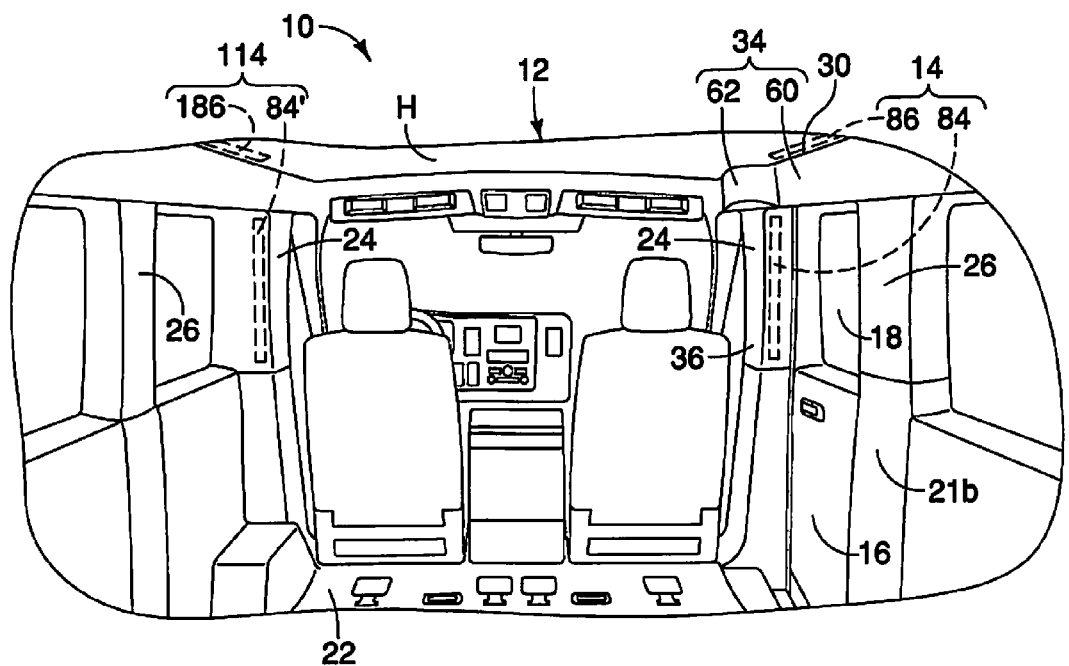
FIG. 2 is a perspective view of a front portion of a passenger compartment of the vehicle, showing the sliding door, B-pillars, C-pillars, roof rails, windows and a plurality of airbag arrangements in accordance with the one embodiment.

Referring initially to FIGS. 1 and 2, a vehicle 10 that includes a vehicle body structure 12 having a plurality of airbag arrangements, 14, 114 (FIGS. 2, 12 and 13) and 214 (FIGS. 12 and 13 only) is illustrated in accordance with a first embodiment. The vehicle 10 depicted in the drawings is a commercial van or a passenger van that includes a sliding door 16 with a window 18. However, as is made clear from the description below and the drawings, the vehicle 10 can be any vehicle that includes a window and is not limited to a commercial van, a passenger van structure or a vehicle with a sliding door, but rather can also be employed in vehicles that include windows without a sliding door.

Figure 11:
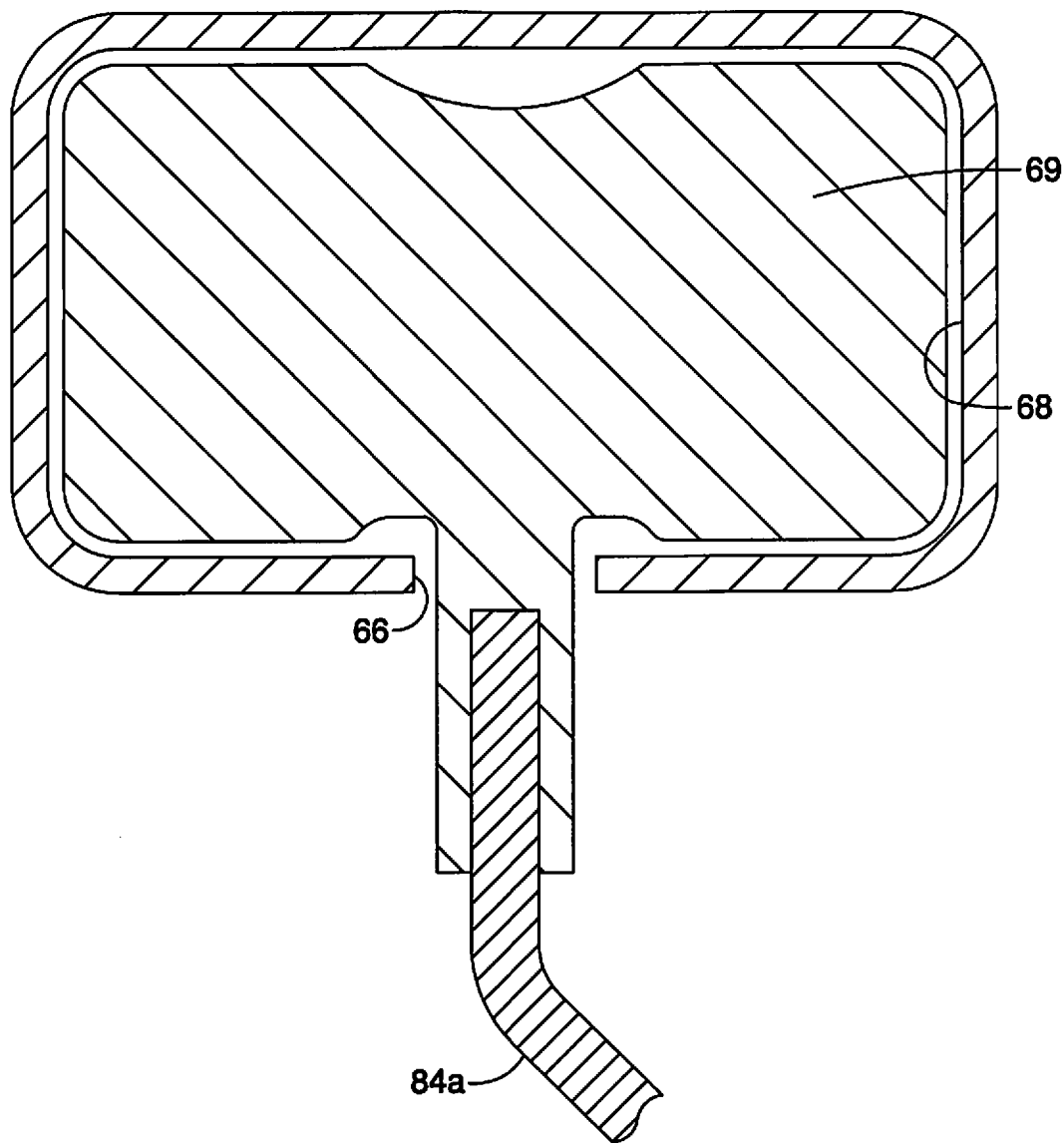
FIG. 11 is a cross-sectional view of a portion of the slide rail housing taken along the line 11-11 in FIG. 10, showing the guide slot and one of the sliding members in accordance with the one embodiment.
Figure 12:
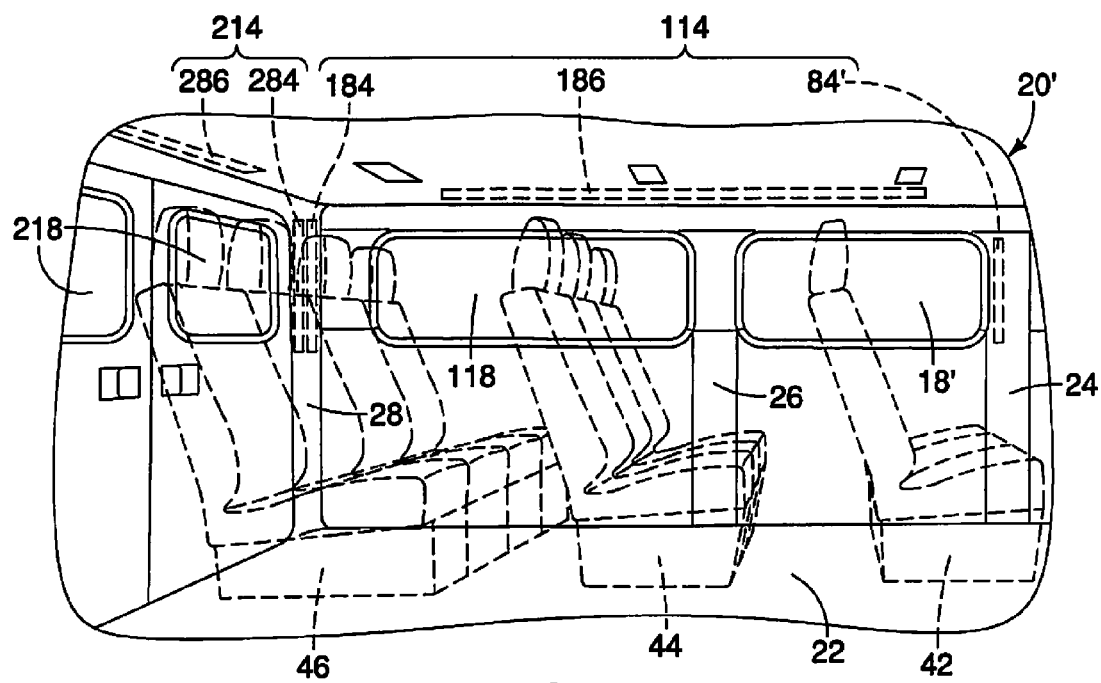
FIG. 12 is a perspective view of a portion of the passenger compartment showing fixed windows, each window being provided with an airbag arrangement shown in a non-deployed orientation in accordance with the one embodiment.
Figure 13:
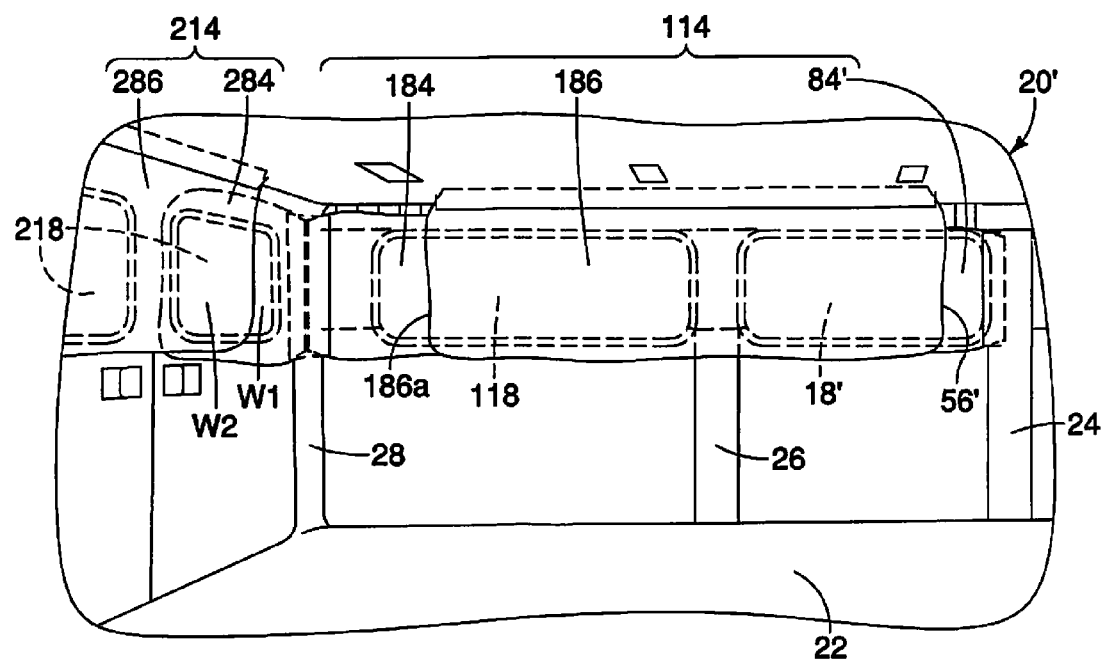
FIG. 13 is another perspective view of the portion of the passenger compartment depicted in FIG. 12, showing the pillar airbags and curtain airbags of the airbag arrangements shown in a deployed orientation covering respective windows in accordance with the one embodiment.

A brief description of the vehicle body structure 12 is now provided with specific reference to FIGS. 1 and 2. The vehicle body structure 12 basically includes, among other elements, a body side structure 20 including a floor 22, B-pillars 24, C-pillars 26, D-pillars 28 (only one D-pillar 28 is shown FIGS. 10 and 11), roof rails 30, a slide rail 32 (FIGS. 1 and 5 only), a slide rail housing 34, a trim panel 36, a headliner H, the airbag arrangement 14, the airbag arrangement 114 and the airbag arrangement 214 (FIGS. 12 and 13 only). The body side structure 20 includes an outer side surface 21a and an inner side surface 21b.

The floor 22 is configured to support a plurality of seats, such as front seats 40, second row seats 42, third row seats 44 (FIG. 12 only) and rear seats 46 (FIG. 12 only). Since seats within a vehicle are conventional elements, further description of the seats 40, 42, 44 and 46 is omitted for the sake of brevity. The B-pillar 24, the C-pillar 26, a portion of the floor 22 and the roof rail 30 on the passenger's side of the vehicle 10 define a door opening 48, such that the sliding door 16 is movable between an open orientation (FIG. 1) exposing the door opening 48 and a closed orientation (FIG. 2) covering the door opening 48. Further, the roof rail 30 is located above both the B-pillar 24 and the C-pillar 26, extending between upper ends thereof, respectively. Specifically, the roof rail 30 includes a first section 30a, a second section 30b and a third section 30c. The first section 30a is located above the B-pillar 24. The second section 30b and the third section 30c are located above the window 18, as is described in greater detail below. The B-pillar 24, the C-pillar 26 and the roof rail 30 are conventional elements. Therefore, further description is omitted for the sake of brevity.

Figure 3:
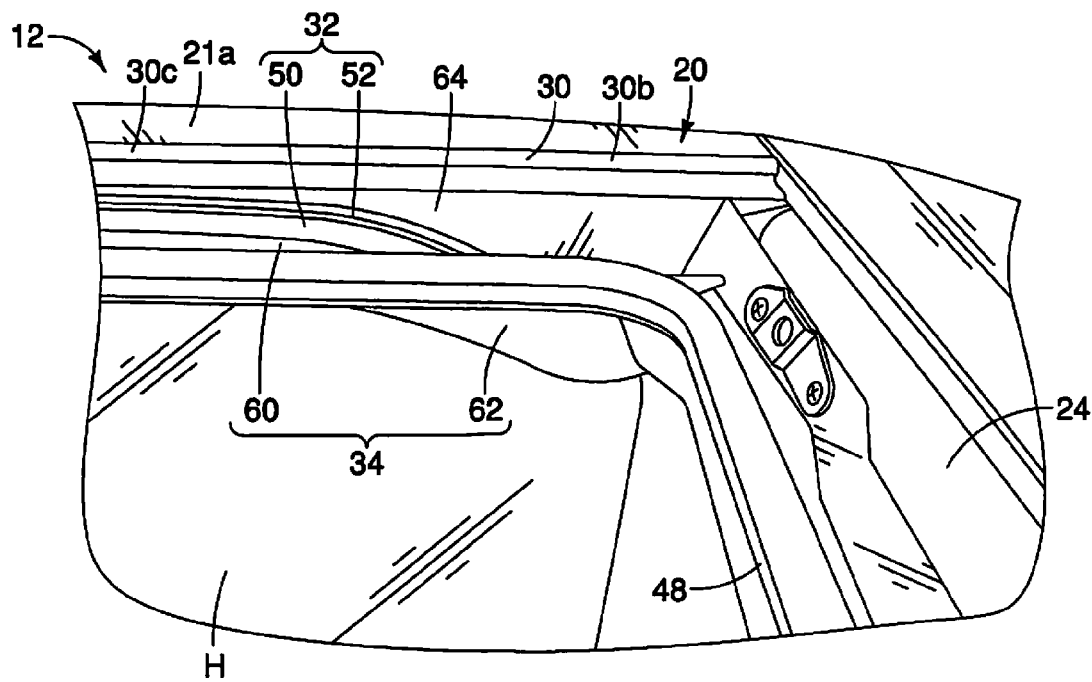
FIG. 3 is a perspective view of an exterior side of an upper end of the B-pillar and the roof rail with the sliding door in an open orientation exposing a slide rail that supports the sliding door for sliding movement in accordance with the one embodiment.
Figure 4:
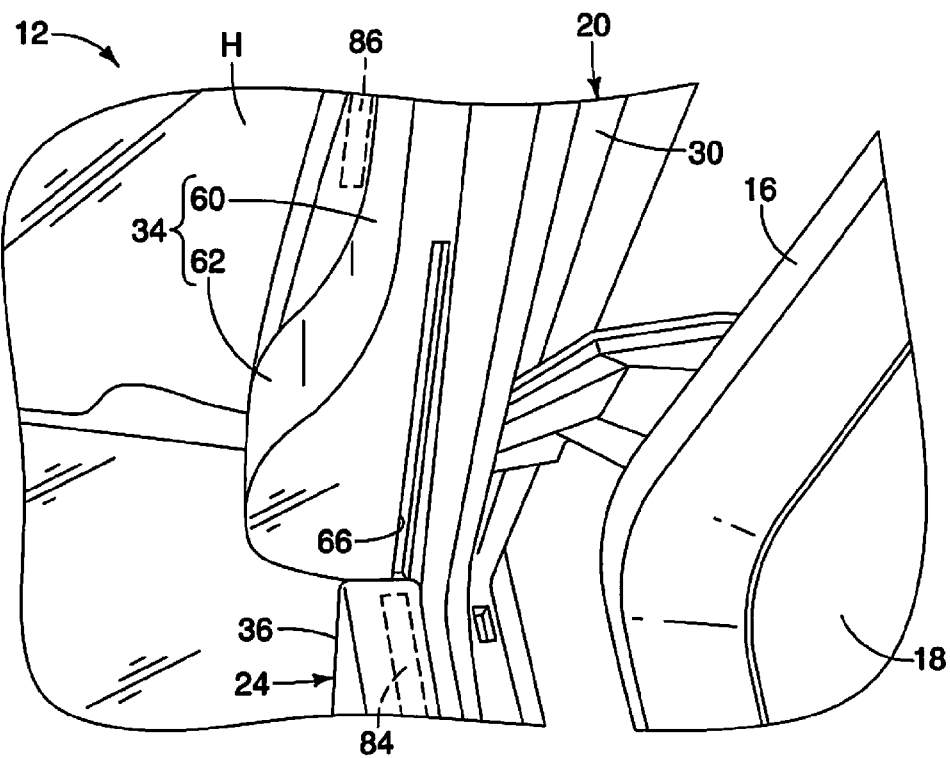
FIG. 4 is a perspective view of an interior side of the upper end of the B-pillar and the roof rail with the sliding door in a partially open orientation showing a slide rail housing that at least partially conceals the slide rail, the slide rail housing having a slot that is open to a guide slot within the slide rail housing in accordance with the one embodiment.

As shown in FIG. 3, the slide rail 32 includes a straight track portion 50 that extends in a vehicle longitudinal direction V and a curved portion 52 located adjacent the B-pillar 24. As shown in FIGS. 1 and 3, the slide rail 32 is positioned above an upper area of the door opening 48 and is only visible when viewing the outer side surface 21a of the body side structure 20 with the sliding door 16 in the open orientation. The slide rail 32 is disposed along the roof rail 30, as is described further below. The sliding door 16 is supported for sliding movement on the body side structure 20 by a plurality of slide rails, including the slide rail 32. Since sliding doors, such as the sliding door 16 and slide rail 32 are conventional elements, further description is omitted for the sake of brevity.

The slide rail 32 is disposed within the slide rail housing 34 and is installed to the body side structure 20 by, for example, removable fasteners, or welding. As viewed from within the vehicle 10 in FIGS. 2 and 4-6, the slide rail housing 34 is a partially enclosed structure that protrudes into an upper area of the passenger compartment of the vehicle 10 above the door opening 48. The slide rail housing 34 includes a straight section 60 and a curved section 62. More specifically, the curved section 62 is referred to herein below as an inboard protruding structure that protrudes into the passenger compartment of the vehicle 10. The straight section 60 of the slide rail housing 34 can extend or protrude into the passenger compartment 10, but is less prominent than the curved section 62 and is not considered to be an inboard protruding structure. The curved section 62 extends along the second section 30b of the roof rail 30 and the straight section 60 of the slide rail housing 34 extends along the third section 30c of the roof rail 30. The straight track portion 50 of the slide rail 32 extends in the vehicle longitudinal direction V within the straight section 60 of the slide rail housing 34. As shown in FIG. 3, the curved portion 52 of the slide rail 32 extends within the curved section 62 of the slide rail housing 34. As is also shown in FIG. 3, the slide rail housing 34 includes a slot 64 that extends in the vehicle longitudinal direction V and is open to the exterior of the vehicle 10 with the door 16 in the open orientation exposing the slide rail 32.

As shown in FIGS. 4 and 7-10, within the interior of the vehicle 10, the slide rail housing 34 also includes a slot 66 and a guide slot 68. The slot 66 and guide slot 68 can be defined by the slide rail housing 34 or alternatively can be defined between either a portion of the slide rail housing 34 or a slide rail housing trim panel that covers the slide rail housing 34. The slot 66 is basically an elongated opening that extends in the vehicle longitudinal direction and is located on a passenger compartment side of the slide rail housing 34 to house the guide slot 68. As shown in FIG. 11, the guide slot 68 is basically a C-channel with the slot 66 being open downward and serving as an elongated opening into the guide slot 68. A pair of sliding members 69 are concealed within the guide slot 68. The sliding members 69 are preferably made of a material having an extremely low friction co-efficient, such that the sliding members 69 can slide freely and with little friction along the guide slot 68 upon deployment of the pillar airbag 84. The guide slot 68 at least partially conceals a sliding member 69 that slide within and along the guide slot 68 in the vehicle longitudinal direction V. Although two of the sliding members 69 are shown in the drawings, any of a variety of numbers of sliding members 69 can be employed. For example, only one of the sliding members 69 is required, but a plurality (more than three) can be employed.

Figure 7:
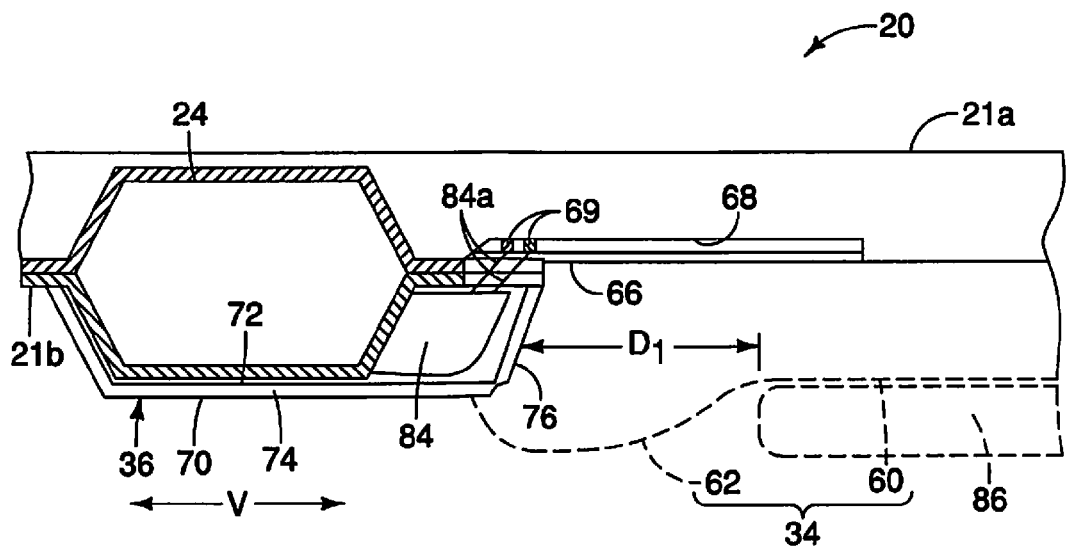
FIG. 7 is a cross-sectional view of the B-pillar and a portion of the slide rail housing (in phantom) taken along the line 7-7 in FIG. 5 with the pillar airbag and the curtain airbag in the non-deployed orientation, showing the guide slot within the slide rail housing and sliding members within the guide slot that support a portion of the pillar airbag in accordance with the one embodiment.
Figure 8:
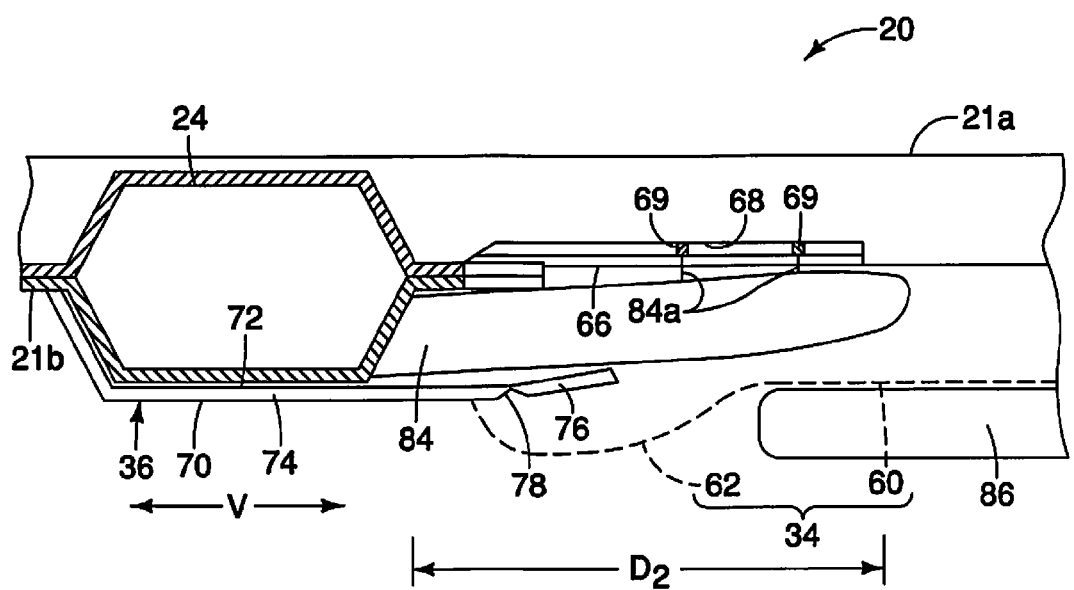
FIG. 8 is another cross-sectional view of the B-pillar and the portion of the slide rail housing (in phantom) taken along the line 8-8 in FIG. 6 with the pillar airbag and the curtain airbag in their respective deployed orientations, with the sliding members within the guide slot supporting the portion of the pillar airbag during deployment in accordance with the one embodiment.

The trim panel 36 (a pillar trim panel) can be mounted to the B-pillar 24 with fasteners and/or snap-fitting members (not shown). As shown in FIGS. 7 and 8, the trim panel 36 includes an interior facing surface 70, a pillar facing surface 72, a body portion 74 and a movable portion 76. The interior facing surface 72 has a vertical ditch line 78 formed along a vertical length of the trim panel 36. The vertical ditch line 78 is a region of reduced thickness defining a hinge between the body portion 74 and the movable portion 76. The vertical ditch line 78 can be aesthetically incorporated into the styling of the interior facing surface 70 of the trim panel 36. Alternatively, the vertical ditch line can be located along the pillar facing surface 72 of the trim panel 36 to be concealed.

Figure 5:
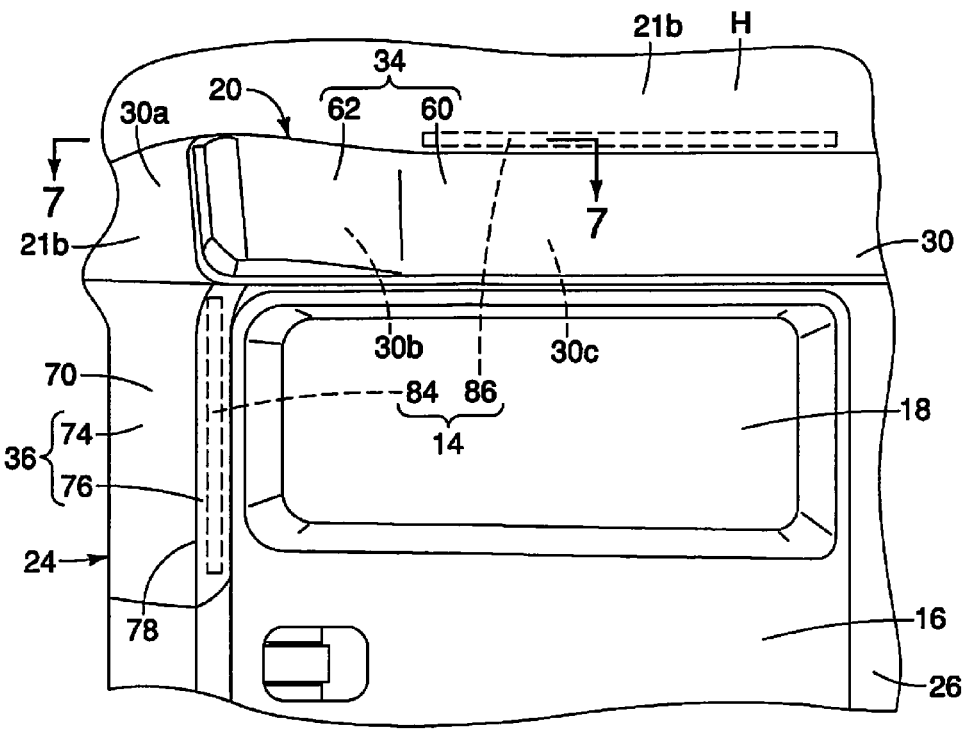
FIG. 5 is a view of a portion of an interior side of the sliding door in a closed orientation showing the B-pillar, the roof rail adjacent to the sliding door, and one of the airbag arrangements including a pillar airbag installed to the B-pillar and a curtain airbag installed to the roof rail, with the pillar airbag and the curtain airbag concealed in respective non-deployed orientations in accordance with the one embodiment.

The airbag arrangement 14 is now described with reference to FIGS. 5-9. The airbag arrangement 14 includes a pillar airbag 84 and a curtain airbag 86. As shown in FIGS. 5 and 7, the pillar airbag 84 is mounted to the B-pillar 24 in a stowed orientation (non-deployed orientation) between the trim panel 36 and the B-pillar 24, and arranged to be deployed in a vehicle longitudinal direction V extending rearward away from the B-pillar 24 in a deployed orientation, as shown in FIGS. 6, 8 and 10.

Figure 6:
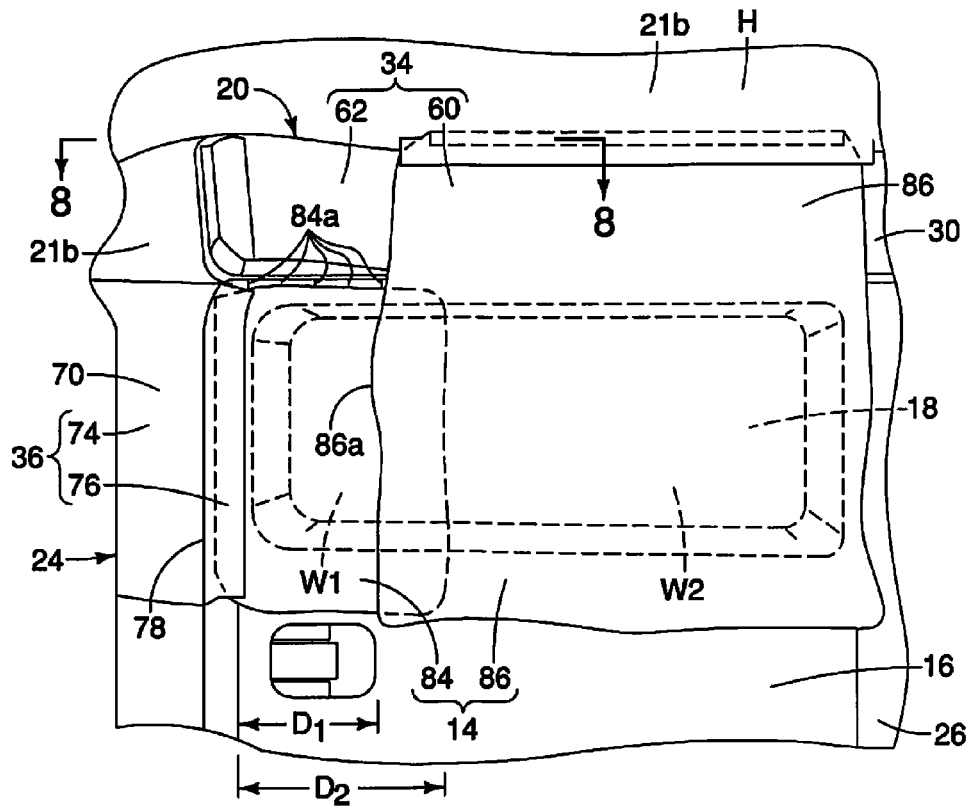
FIG. 6 is another is a view of the portion of an interior side of the sliding door similar to FIG. 5, showing the pillar airbag and the curtain airbag in respective deployed orientations completely covering the door window in accordance with the one embodiment.
Figure 9:
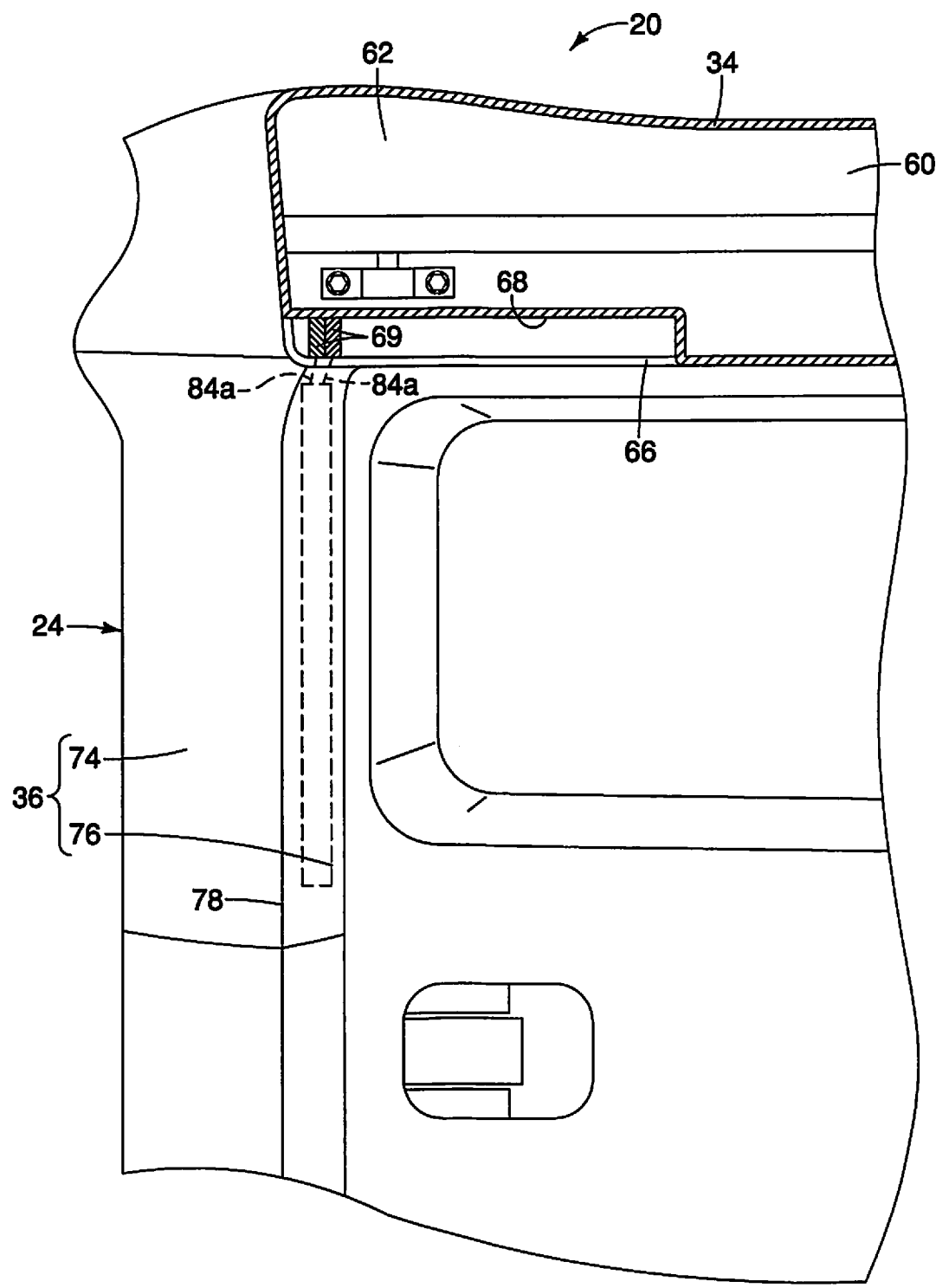
FIG. 9 is an elevational view of a portion of an interior side of the vehicle showing of the sliding door in a closed orientation and also showing the B-pillar, the roof rail, and the slide rail housing, with a portion of the slide rail housing in cross-section revealing sliding members within the guide slot, the sliding members supporting the pillar airbag in the non-deployed orientation in accordance with the one embodiment.
Figure 10:
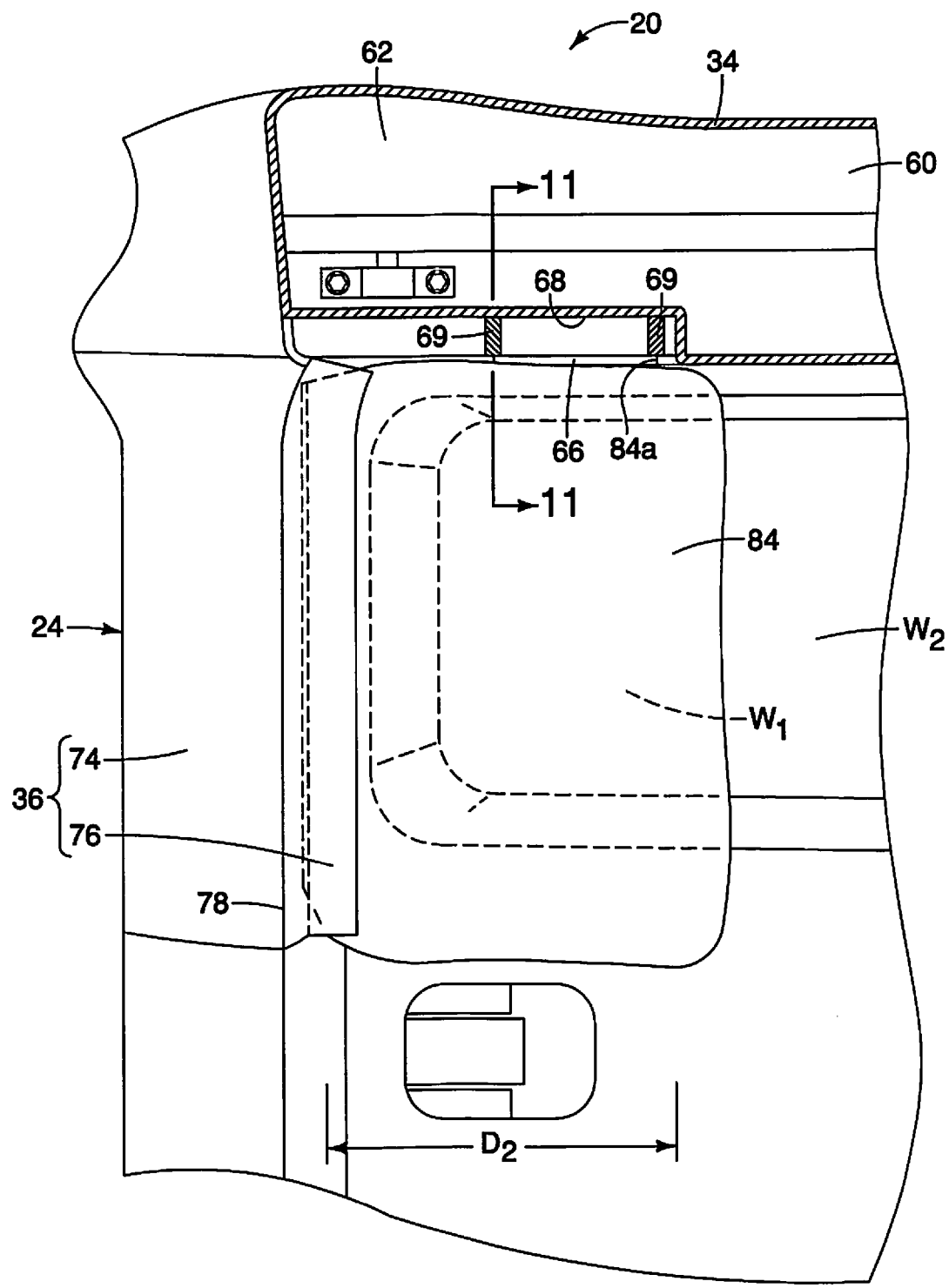
FIG. 10 is another elevational view of the portion of the interior side of the vehicle similar to FIG. 9, showing the portion of the slide rail housing in cross-section revealing the sliding members within guide slot, the sliding members supporting the pillar airbag in the deployed orientation, with the curtain airbag removed for greater clarity in accordance with the one embodiment.

As shown in FIGS. 6, 8 and 10, in the deployed orientation the pillar airbag 84 covers a first portion $W_1$ of the window 18. In FIG. 9, the curtain airbag 86 is completely removed in order to more clearly show the deployment of the pillar airbag 84. However, it should be understood from the drawings and the description herein that in the depicted embodiment the pillar airbag 84 is deployed together (simultaneously, or with some delay) with the curtain airbag 86.

As shown in FIGS. 6-10, the pillar airbag 84 includes a plurality of tethers 84a that are fixed to an upper edge of the pillar airbag 84. The tethers 84a can be made of a textile material and/or metallic wire that slidably support the pillar airbag 84 to the sliding members 69 within the guide slot 68. The tethers 84a are fixed at one end to an upper edge of the pillar airbag 84 and the other end to lower ends of the sliding members 69. For example, an upper end of each of the tethers 84a can be embedded within the material that forms a respective one of the sliding members 69, as shown in FIG. 11. Alternatively, the sliding member 69 can be formed as rings that slide along a rod positioned within the guide slot 68. Hence, in the stowed orientation (FIGS. 5 and 7), the tethers 84a are concealed behind the trim panel 36 but extend through a forward section of the slot 66 into the guide slot 68, connecting to the sliding members 69.

The guide slot 68 extends along an area above the first portion $W_1$ of the window 18, such that the sliding members 69 can slide with the tethers 84a along the guide slot 68 upon deployment of the pillar airbag 84. Thus, the upper end of the pillar airbag 84 is guided by movement of the sliding member 69 or sliding members 69 during deployment to move in a specific direction relative to the window 18. More specifically, the sliding members 69 can move along the curved portion section 62 of the slide rail housing 34 and the curved portion 52 of the slide rail 32 since they are installed within the linear guide slot 68.

When the pillar airbag 84 (and the curtain airbag 86) is deployed, the movable portion 76 of the trim panel 36 moves relative to the body portion 74 in response to the pillar airbag 84 moving from the stowed orientation to the deployed orientation, as shown in FIGS. 6, 8 and 10. Specifically, the movable portion 76 is positioned on a rearward side of the B-pillar 24. As the pillar airbag 84 deploys, the pillar airbag 84 moves in the vehicle rearward direction V pushing against the movable portion 76 of the trim panel 36. Hence, the vertical ditch line 78 serves as a hinge allowing the movable portion 76 to pivot as the pillar airbag 84 extends in the vehicle rearward direction V toward the deployed orientation. As the pillar airbag 84 is deployed, the sliding members 69 help to guide the expansion of the pillar airbag 84 such that the pillar airbag 84 remains outboard relative to the curtain airbag 86.

A description of the curtain airbag 86 is now provided with reference to FIGS. 5-8. As indicated in FIG. 5, the curtain airbag 86 is mounted to the roof rail 30 and/or the slide rail housing 34 in a stowed orientation. The curtain airbag 86 is concealed by, for example, a headliner or a trim panel, in the stowed orientation along the roof rail 30 and the straight section 60 of the slide rail housing 34. The curtain airbag 86 is arranged to be deployed in a downward direction extending away from the roof rail 30 and the side rail housing 34 to a deployed orientation, as shown in FIG. 6. When both the pillar airbag 84 and the curtain airbag 86 are in their respective deployed positions as shown in FIGS. 6 and 8, the pillar airbag 84 is arranged outboard of the curtain airbag 86 with the curtain airbag overlaying a portion of the pillar airbag 86 with respect to a vehicle lateral direction.

The curtain airbag 86 has a forward edge 86a that is spaced apart from the B-pillar 24 in the vehicle longitudinal direction V by a first distance $D_1$ while in the deployed orientation, as shown in FIGS. 6 and 8. Further, the pillar airbag 84 extends rearward from the B-pillar 24 by a second distance $D_2$ that is greater than the first distance $D_1$. Hence, although the curtain airbag 86 is located rearward of the pillar airbag 84, the curtain airbag 86 overlaps or overlays a portion of the pillar airbag 84 with respect to a vehicle lateral direction transverse to the vehicle longitudinal direction V while the pillar airbag 84 and the curtain airbag 86 are in their deployed orientations, respectively.

As is shown in FIGS. 6 and 10, the pillar airbag 84 covers the first portion $W_1$ of the window 18. As shown in FIG. 10, the curtain airbag 86 covers a second portion $W_2$ of the window 18. Due to the presence of the curved portion 52 of the slide rail 32, it is difficult to package the curtain airbag 86, if the curtain airbag 86 were to extend all the way to the B-pillar 24. However, by utilizing the pillar airbag 84 with the curtain airbag 86, the pillar airbag 84 and the curtain airbag 86 of the airbag arrangement 14 completely covers the window 18 while in their respective deployed orientations.

A description of the airbag arrangement 114 is now provided with specific reference to FIGS. 12 and 13. As indicated in FIG. 12, in stowed orientations, the airbag arrangement 114 includes a pillar airbag 84', a curtain airbag 186 and a second pillar airbag 184. The pillar airbag 84' is installed to the B-pillar 24 on the driver's side of the vehicle 10. The curtain airbag 186 is installed along the roof rail 30 in a manner similar to that of the curtain airbag 86, except that the curtain airbag 186 is not located adjacent to or within a slide rail housing, and the curtain airbag 186 extends above both a window 18' and a window 118. Specifically, the curtain airbag 186 is installed to either the roof rail 30 or a portion of the roof side structure (not shown) of the vehicle 10. There is no sliding door on the driver's side of the vehicle 10, as depicted in FIGS. 12 and 13. Therefore, there is no slide rail housing present. Hence, a slot, a cavity and guide rail similar to the slot 66, the guide slot 68, sliding members 69 are provided along the roof rail 30 and a corresponding roof rail trim panel or headliner on the driver's side of the vehicle 10.

The pillar airbag 184 is installed to a forward portion of the D-pillar 28 in a manner similar to the installation of the pillar airbag 84 to the B-pillar 24.

The deployment of the pillar airbag 84', the curtain airbag 186 and the pillar airbag 184 of the airbag arrangement 14' is generally the same as described above with respect to the airbag arrangement 14. In the deployed orientation shown in FIG. 11, the pillar airbag 84' covers a first portion $W_1$ of the window 18' and the curtain airbag 186 covers a second portion $W_2$ of the window 18'. The curtain airbag 186 also covers a forward portion of the window 118 and the pillar airbag 184 covers a rearward portion of the window 118. Further the curtain airbag 186 overlaps or overlays a rearward portion of the pillar airbag 84' and a forward portion of the pillar airbag 184, with the pillar airbag 84' and the pillar airbag 184 both being located outboard of the curtain airbag 186.

As is also shown in FIG. 12, in stowed orientations, the airbag arrangement 214 includes a pillar airbag 284 and a curtain airbag 286. The pillar airbag 284 is installed to a rearward inboard facing side of the D-pillar 28. The curtain airbag 286 is installed along the roof rail 30 or a portion of the roof side structure (not shown) of the vehicle 10 above rear doors that include rear glass windows 218. A slot, a cavity and guide rail similar to the slot 66, the guide slot 68, sliding members 69 are provided along the roof rail and a corresponding roof rail trim panel or the headliner at the rear of the vehicle 10 adjacent to the D-pillar 28.

The deployment of the pillar airbag 284 and the curtain airbag 286 of the airbag arrangement 214 is generally the same as described above with respect to the airbag arrangements 14 and 114 except that when in the deployed orientation, the pillar airbag 284 extends from the D-pillar 28 in a vehicle lateral direction or inboard direction. In the deployed orientation shown in FIG. 13, the pillar airbag 284 covers a driver's side portion $W_1$ of the window 118 and the curtain airbag 286 covers a central portion of the windows 218. Further the curtain airbag 286 overlaps or overlays a portion of the pillar airbag 284 in the vehicle longitudinal direction V transverse to the vehicle lateral direction, with the pillar airbag 284 being located rearward or outboard of the curtain airbag 186.

Although not shown, the D-pillar on the passenger's side of the vehicle 10 can include another pillar airbag, similar to the pillar airbag 284.

Each of the airbag arrangements 14, 114 and 214 includes its own set of airbag deploying mechanisms or deploying devices. More specifically, each of the pillar airbags 84, 84', 184 and 284, and the curtain airbags 86, 186 and 286 includes its own dedicated deploying mechanism (not shown) that is in turn connected to a triggering mechanism or controller (not shown) provided within the vehicle 10. The triggering mechanism or controller and the deploying mechanisms associated with each of the pillar airbags 84, 84', 184 and 284 and the curtain airbags 86, 186 and 286 are conventional components. Since the deploying mechanisms and the triggering mechanism are conventional components, further description is omitted for the sake of brevity.

The various elements and features of the vehicle 10 (other than the airbag arrangements described herein) are conventional components that are well known in the art. Since the other elements and features of the vehicle 10 are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the airbag arrangements. Accordingly, these terms, as utilized to describe the present invention should be interpreted relative to a vehicle equipped with the airbag arrangements.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
    a pillar;
    a roof structure located above the pillar;
    a body structure section having a first side window edge and an upper window edge that together at least partially define a window opening, the side window edge being located adjacent the pillar and the upper window edge being located adjacent the roof structure;
    a curtain airbag mounted to the roof structure for deployment from a stowed orientation to a deployed orientation, such that in the stowed orientation the curtain airbag extends along the roof structure and in the deployed orientation the curtain airbag extends downward from the roof structure covering at least a portion of the upper window edge with a first side edge of the curtain airbag closest to the side window edge being spaced apart from the side window edge by a first distance; and
    a pillar airbag mounted to the pillar for deployment from a stowed orientation to a deployed orientation such that in the stowed orientation the pillar airbag extends along the pillar and in the deployed orientation the pillar airbag extends from the pillar across the side window edge, with a distal end of the pillar airbag being positioned at a second distance from the side window edge, the second distance being greater than the first distance such that the first side edge of the curtain airbag is positioned inboard of the pillar airbag, and the curtain airbag overlaps a portion of the pillar airbag such that the distal end of the pillar airbag is positioned between the curtain airbag and the window opening.

2. The vehicle body structure according to claim 1, wherein the body structure section defines a door opening and includes a sliding door movable between a closed position covering the door opening and an open position exposing the door opening, the side window edge, the upper window edge and the window opening being defined on the sliding door.

3. The vehicle body structure according to claim 1, wherein the body structure section further has a second side window edge opposite the first side window edge and a lower window edge, the upper window edge extending between respective upper ends of the first side window edge and the second side window edge, the lower window edge extending between respective lower ends of the first side window edge and the second side window edge, the first side window edge, the second side window edge, the upper window edge and the lower window edge defining the window opening, the window opening being divided into a first portion and a second portion, the first portion extending from the first side window edge below a first section of the upper window edge and above a first section of the lower window edge, and the second portion extending from the second side window edge toward the first side window edge below a remainder of the upper window edge and above a remainder of the lower window edge, in their respective deployed orientations the pillar airbag covers at least the first portion of the window opening and the curtain airbag covers the second portion of the window opening and does not cover the first portion of the window opening.

4. The vehicle body structure according to claim 1, wherein the pillar airbag extends from the pillar in a vehicle rearward direction while in the deployed orientation.

5. The vehicle body structure according to claim 1, wherein the pillar airbag extends from the pillar in a vehicle frontward direction while in the deployed orientation.

6. The vehicle body structure according to claim 1, wherein the pillar airbag extends from the pillar in a vehicle lateral direction while in the deployed orientation.

7. The vehicle body structure according to claim 1, further comprising
a guide rail extending along an area above the window opening, with an upper end of the pillar airbag being movably coupled to the guide rail.

8. A vehicle body structure comprising:
a pillar;
a roof structure located above the pillar;
a body structure section having a first side window edge, a second side window edge opposite the first side window edge, an upper window edge and a lower window edge, the upper window edge extending between respective upper ends of the first side window edge and the second side window edge, the lower window edge extending between respective lower ends of the first side window edge and the second side window edge, the first side window edge, the second side window edge, the upper window edge and the lower window edge defining a window opening, the first side window edge being located adjacent the pillar and the upper window edge being located adjacent the roof structure, the window opening further being divided into a first portion and a second portion, the first portion extending from the first side window edge below a first section of the upper window edge and above a first section of the lower window edge, and the second portion extending from the second side window edge toward the first side window edge below a second section of the upper window edge and above a second section of the lower window edge;
a pillar airbag mounted to the pillar for deployment from a stowed orientation to a deployed orientation such that in the stowed orientation the pillar airbag extends along the pillar and in the deployed orientation the pillar airbag extends from the pillar across the first side window edge covering at least the first portion of the window opening; and
a curtain airbag mounted to the roof structure for deployment from a stowed orientation to a deployed orientation such that in the stowed orientation the curtain airbag extends along the roof structure and in the deployed orientation the curtain airbag extends downward from the roof structure covering the second section of the upper window edge of the window opening and covering only the second portion of the window opening and not covering the first portion of the window opening such that the entire window opening is covered by the curtain airbag and the pillar airbag with the curtain airbag and the pillar airbag in their respective deployed orientations.

9. The vehicle body structure according to claim 8, wherein the pillar airbag extends from the pillar in a vehicle rearward direction while in the deployed orientation.

10. The vehicle body structure according to claim 8, wherein
the pillar airbag extends from the pillar in a vehicle frontward direction while in the deployed orientation.

11. The vehicle body structure according to claim 8, wherein
the body structure section defines a door opening and includes a sliding door movable between a closed position covering the door opening and an open position exposing the door opening, the first side window edge, the second side window edge, the upper window edge, the lower window edge and the window opening all being located on the sliding door.

12. The vehicle body structure according to claim 8, wherein
in their respective deployed orientations, a first side edge of the curtain airbag closest to the first side window edge is spaced apart from the first side window edge by a first distance, and a distal end of the pillar airbag is positioned at a second distance from the first side window edge, the second distance being greater than the first distance such that the first side edge of the curtain airbag is positioned inboard of the pillar airbag, and the curtain airbag overlaps a portion of the pillar airbag such that the distal end of the pillar airbag is positioned between the curtain airbag and the window opening.

13. The vehicle body structure according to claim 8, further comprising
a guide rail extending along an area above the window opening, with an upper end of the pillar airbag being movably coupled to the guide rail.

14. The vehicle body structure according to claim 8, wherein
the pillar airbag extends from the pillar in a vehicle lateral direction while in the deployed orientation.

15. A vehicle body structure comprising:
a pillar;
a roof side structure that extends in a vehicle longitudinal direction and includes a first roof side section, a second roof side section and a third roof side section, the first roof side section being located above the pillar, the second roof side section extending from the first roof side section away from the pillar to the third roof side section and including an inboard protruding structure, and the third roof side section extending from the second roof side structure away from the inboard protruding structure;
a vehicle side structure extending beneath second and third roof side sections of the roof side structure and defining a window opening, the window opening having a first portion and a second portion, the first portion being defined directly beneath the inboard protruding structure and the second portion being defined beneath the third roof side section of the roof side structure, the second portion of the window opening being located adjacent to the first portion;

a pillar airbag mounted to the pillar for deployment from a stowed orientation to a deployed orientation such that in the stowed orientation the pillar airbag extends along the pillar and in the deployed orientation the pillar airbag extends from the pillar under the inboard protruding structure of the roof side structure covering at least the first portion of the window opening; and a curtain airbag mounted to the third roof side section of the roof side structure for deployment from a stowed orientation to a deployed orientation such that in the stowed orientation a first side edge of the curtain airbag is located adjacent to one side of the inboard protruding structure and a remainder of the curtain airbag extends along the third roof side section of the roof side structure in a direction away from the inboard protruding structure, and in the deployed orientation the curtain airbag extends downward from the roof side structure covering the second portion of the window opening with an upper portion of the first side edge adjacent to the one side of the inboard protruding structure and a remainder of the first side edge of the curtain airbag extending down from upper portion such that the window opening is completely covered by the curtain airbag and the pillar airbag with the curtain airbag and the pillar airbag in their respective deployed orientations.

16. The vehicle body structure according to claim 15, wherein
the vehicle side structure defines a door opening and includes a sliding door movable between a closed position covering the door opening and an open position exposing the door opening, the window opening being located on the sliding door.

17. The vehicle body structure according to claim 16, wherein
the roof side structure further includes a slide rail that includes a curved portion and a track portion, the curved portion being located adjacent the pillar within inboard protruding structure and the track portion extending along the third roof side section in the vehicle longitudinal direction, and
the sliding door is configured to slide along the slide rail between the open position and the closed position.

18. The vehicle body structure according to claim 15, wherein
the curtain airbag is located rearward of the pillar airbag, and the pillar airbag extends from the pillar in the vehicle rearward direction while in the deployed orientation.

19. The vehicle body structure according to claim 15, wherein
the curtain airbag is located frontward of the pillar airbag, and the pillar airbag extends from the pillar in the vehicle frontward direction while in the deployed orientation.

20. The vehicle body structure according to claim 15, further comprising
a guide rail extending along an area above the window opening, with an upper end of the pillar airbag being movably coupled to the guide rail.

21. The vehicle body structure according to claim 15, wherein in their respective deployed orientations the pillar airbag covers at least the first portion of the window opening and the curtain airbag covers only the second portion of the window opening and not the first portion of the window opening.

* * * * *